(12) United States Patent
Sole et al.

(10) Patent No.: US 12,360,767 B2
(45) Date of Patent: Jul. 15, 2025

(54) DATA PROCESSING APPARATUS, METHOD AND VIRTUAL MACHINE

(71) Applicant: Arm Limited, Cambridge (GB)

(72) Inventors: Michael Jean Sole, Cambridge (GB); Cedric Denis Robert Airaud, Cambridge (GB)

(73) Assignee: Arm Limited, Cambridge (GB)

( * ) Notice: Subject to any disclaimer, the term of this patent is extended or adjusted under 35 U.S.C. 154(b) by 49 days.

(21) Appl. No.: 18/178,123

(22) Filed: Mar. 3, 2023

(65) Prior Publication Data

US 2023/0289185 A1    Sep. 14, 2023

(30) Foreign Application Priority Data

Mar. 10, 2022  (GB) ..................... 2203364

(51) Int. Cl.
*G06F 9/44* (2018.01)
*G06F 9/30* (2018.01)
*G06F 9/38* (2018.01)

(52) U.S. Cl.
CPC ........ *G06F 9/30145* (2013.01); *G06F 9/3836* (2013.01)

(58) Field of Classification Search
CPC .......................... G06F 9/30145; G06F 9/3836
See application file for complete search history.

(56) References Cited

U.S. PATENT DOCUMENTS

| | | | | |
|---|---|---|---|---|
| 6,016,540 A * | 1/2000 | Zaidi | ...................... | G06F 9/384 712/216 |
| 6,862,676 B1 * | 3/2005 | Knapp | .................. | G06F 9/3836 712/213 |
| 6,988,183 B1 * | 1/2006 | Wong | .................... | G06F 9/3858 712/E9.037 |
| 7,350,056 B2 * | 3/2008 | Abernathy | ............ | G06F 9/3836 712/216 |
| 8,533,251 B2 * | 9/2013 | Brokenshire | ........... | G06F 17/16 708/514 |
| 9,262,171 B2 * | 2/2016 | Golla | .................... | G06F 9/3842 |
| 10,216,520 B2 * | 2/2019 | Day | ....................... | G06F 9/3836 |

(Continued)

FOREIGN PATENT DOCUMENTS

WO  2012/087548 A2  6/2012

OTHER PUBLICATIONS

Robert Bedichek, "Some Efficient Architecture Simulation Techniques", Department of Computer Science, FR-35 University of Washington, 1990.

*Primary Examiner* — Cheng Yuan Tseng
(74) *Attorney, Agent, or Firm* — NIXON & VANDERHYE P.C.

(57) ABSTRACT

A data processing apparatus comprises processing circuitry to execute processing instructions, the processing circuitry comprising: a set of physical registers; instruction decoder circuitry to decode processing instructions; detector circuitry to detect groups of instructions which comply with a conflict condition, in which a group of instructions complies with the conflict condition at least when a given storage element is written to by a maximum of one instruction of that group of instructions; instruction issue circuitry to issue decoded instructions for execution; and instruction execution circuitry to execute instructions decoded by the instruction decoder circuitry.

16 Claims, 7 Drawing Sheets

(56) References Cited

U.S. PATENT DOCUMENTS

| | | | |
|---|---|---|---|
| 10,671,564 B2 * | 6/2020 | Henry | G06N 3/08 |
| 10,776,110 B2 * | 9/2020 | Pearce | G06F 9/30036 |
| 11,301,591 B2 * | 4/2022 | Saileshwar | G06F 21/54 |
| 11,488,066 B2 * | 11/2022 | Shah | G06N 20/00 |
| 11,829,767 B2 * | 11/2023 | Tran | G06F 1/14 |
| 2012/0159130 A1 | 6/2012 | Smelyanskiy | |
| 2021/0048991 A1 * | 2/2021 | Tanner | G06F 17/153 |

* cited by examiner

DATA PROCESSING APPARATUS, METHOD AND VIRTUAL MACHINE

CROSS-REFERENCE TO RELATED APPLICATIONS

This application claims priority pursuant to 35 U.S.C. 119(a) to United Kingdom Application No. 2203364.1, filed Mar. 10, 2022, which application is incorporated herein by reference in its entirety.

BACKGROUND

This disclosure relates to data processing apparatus, methods and virtual machines.

Some data processing arrangements allow for processing operations to be performed with respect to matrices such as square or rectangular matrices or even matrices of more than two dimensions.

SUMMARY

In an example arrangement there is provided data processing apparatus comprising: processing circuitry to execute processing instructions having an instruction order to generate one or more rows and/or one or more columns of an n×m matrix using a storage array having an n×m array of storage elements to hold one or more values generated by the instruction execution, where n and m are respective integers greater than one, each processing instruction defining one or more architectural registers to store one or more source operands, the processing circuitry comprising: a set of physical registers; instruction decoder circuitry to decode processing instructions; detector circuitry to detect groups of instructions which comply with a conflict condition, in which a group of instructions complies with the conflict condition at least when a given storage element is written to by a maximum of one instruction of that group of instructions; instruction issue circuitry to issue decoded instructions for execution; and instruction execution circuitry to execute instructions decoded by the instruction decoder circuitry, the instruction execution circuitry being configured to execute a decoded instruction by reference to one or more source operands stored by the set of architectural registers and to hold one or more values generated by that decoded instruction, the instruction execution circuitry comprising: the storage array; and out of order circuitry to selectively provide out of order execution of a group of processing instructions detected by the detector circuitry to comply with the conflict condition.

In another example arrangement there is provided a data processing method comprising: executing processing instructions having an instruction order to generate one or more rows and/or one or more columns of an n×m matrix using a storage array having an n×m array of storage elements to hold one or more values generated by the instruction execution, where n and m are respective integers greater than one, each processing instruction defining one or more architectural registers to store one or more source operands, the executing step comprising: decoding processing instructions; detecting groups of instructions which comply with a conflict condition, in which a group of instructions complies with the conflict condition at least when a given storage element is written to by a maximum of one instruction of that group of instructions; issuing decoded instructions for execution; and executing decoded instructions by reference to one or more source operands stored by the set of architectural registers and holding, using the storage array, one or more values generated by the decoded instructions, comprising selectively providing out of order execution of a group of processing instructions detected by the detector circuitry to comply with the conflict condition.

In another example arrangement there is provided a virtual machine comprising a data processor to execute a computer program comprising machine readable instructions, in which execution of the computer program causes the data processor to operate as a data processing apparatus comprising: processing circuitry to execute processing instructions having an instruction order to generate one or more rows and/or one or more columns of an n×m matrix using a storage array having an n×m array of storage elements to hold one or more values generated by the instruction execution, where n and m are respective integers greater than one, each processing instruction defining one or more architectural registers to store one or more source operands, the processing circuitry comprising: a set of physical registers; instruction decoder circuitry to decode processing instructions; detector circuitry to detect groups of instructions which comply with a conflict condition, in which a group of instructions complies with the conflict condition at least when a given storage element is written to by a maximum of one instruction of that group of instructions; instruction issue circuitry to issue decoded instructions for execution; and instruction execution circuitry to execute instructions decoded by the instruction decoder circuitry, the instruction execution circuitry being configured to execute a decoded instruction by reference to one or more source operands stored by the set of architectural registers and to hold one or more values generated by that decoded instruction, the instruction execution circuitry comprising: the storage array; and out of order circuitry to selectively provide out of order execution of a group of processing instructions detected by the detector circuitry to comply with the conflict condition.

Further respective aspects and features of the disclosure are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Overview of Processor

Figure 1:
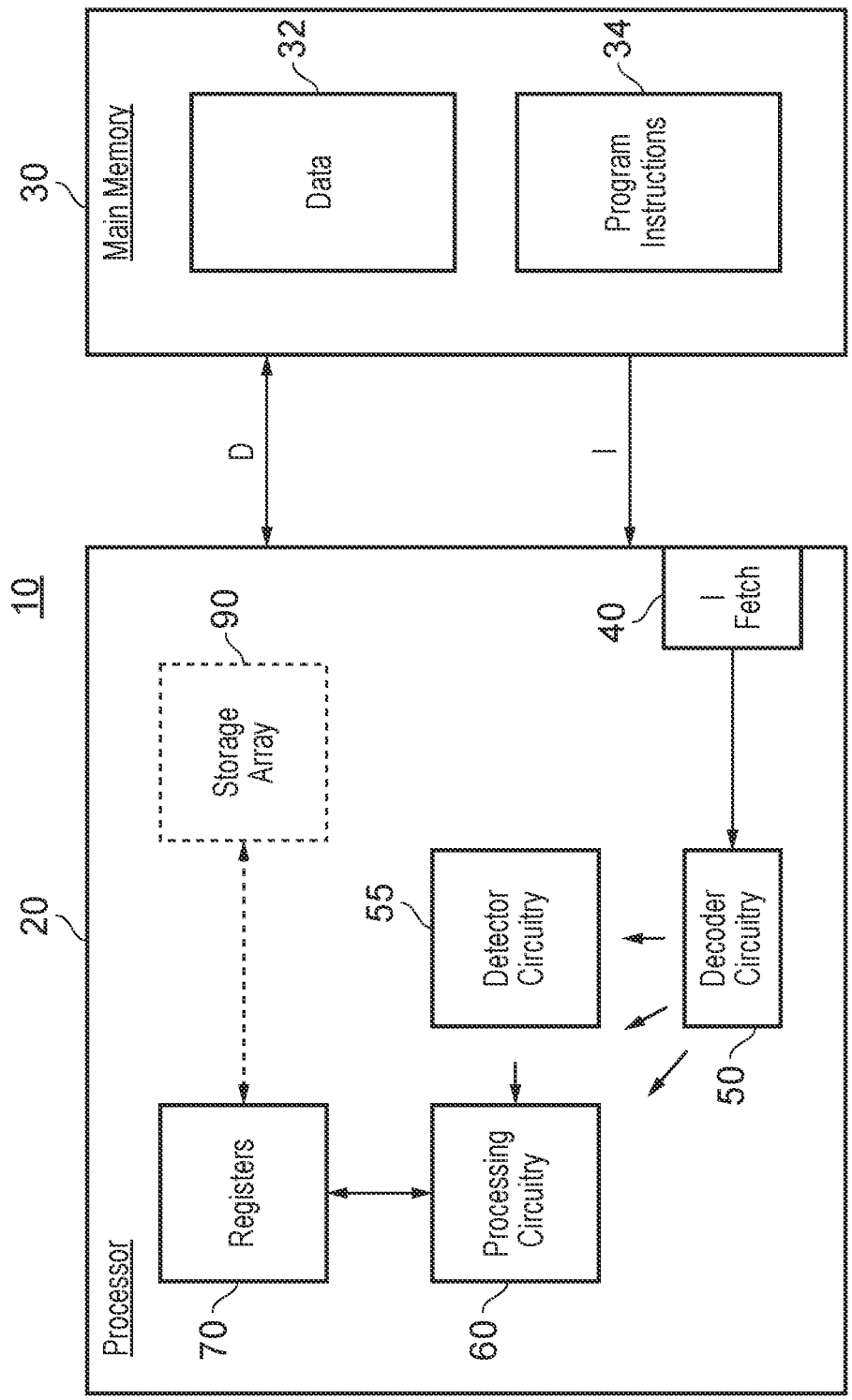
FIG. 1 schematically illustrates a data processing apparatus.

Referring now to the drawings, FIG. 1 schematically illustrates a data processing system 10 comprising a processor 20 coupled to a memory 30 storing data values 32 and program (or processing) instructions 34. The processor 20 includes an instruction fetch unit 40 for fetching program instructions 34 from the memory 30 and supplying the fetch program instructions to decoder circuitry 50. The decoder circuitry 50 decodes the fetched program instructions and generates control signals to control processing circuitry 60 to perform processing operations upon registers stored within register circuitry 70 as specified by the decoded vector instructions.

The processor 20 can access a storage array 90. This is drawn in broken line to illustrate that it may or may not be provided as part of the processor 20. The storage array may be considered in at least some examples as an accumulation array, referred to as "ZA" in a so-called Scalable Matrix Extension (SME) system provided or specified by Arm Limited.

In at least some examples, ZA is implemented as an n×m (square or rectangular) array of storage (or accumulation) elements. In some examples, n and m may be the same and may be equal to SVL or in other words the streaming vector length in use within the system (as defined with a so-called Scalable Vector Extension (SVE) or SVE2 system provided or specified by Arm Limited). It is not however a requirement that these values of n and m are used; just that they are each at least 2. The value n could equal m or they could be different. In other words, it is also not a requirement that the storage array is in fact of a particular configuration (such as square), just that it can provide an n×m array as described above (even if other elements are provided). Further, the accumulation array does not have to be a two-dimensional array; more than two dimensions could be provided.

SME instructions can refer to various types of matrix operands, including "tiles" representing a subset of ZA. In some examples the tile is itself a square array but this is not a requirement and (for example) rectangular tiles could be used. So-called "tile vectors" represent rows or columns of ZA. An operand referred to as the "accumulator matrix" refers to the whole of ZA.

The processing circuitry 60 may provide or may include vector and/or matrix processing circuitry. A general distinction between scalar processing and vector processing is as follows. Vector processing involves applying a single vector processing instruction to data items of a data vector having a plurality of data items at respective positions in the data vector. Scalar processing operates on, effectively, single data items rather than on data vectors. Vector processing can be useful in instances where processing operations are carried out on many different instances of the data to be processed. In a vector processing arrangement, a single instruction can be applied to multiple data items (of a data vector) at the same time. This can improve the efficiency and throughput of data processing compared to scalar processing.

The processing circuitry can be used to perform operations with respect to matrices. Here, a matrix may be considered as an array of matrix elements. The array may be two dimensional or may have a higher dimensionality.

While the present embodiments may be relevant to vector processing, it is not a requirement that a vector processor is used. Instead, the present techniques relate to processing two dimensional arrays of data items, stored in for example the storage array 90. The two-dimensional storage arrays may, in at least some examples, be accessed as one-dimensional arrays of data items in multiple candidate directions. While such a one-dimensional array of data items may be handled in some examples as a data vector, this is not an essential requirement of the present techniques.

In example embodiments, the storage array 90 may store a square array portion of a larger or even higher-dimensioned array or matrix of data items in memory.

The discussion below relates to example program instructions 34. Embodiments of the present disclosure include an apparatus, for example of the type shown in FIG. 1, operable or configured to decode and execute such program instructions.

The processing circuitry 60 is therefore configured to execute processing instructions having an instruction order to generate one or more rows and/or one or more columns of an n×m matrix using the storage array 90 having an n×m array of storage elements to hold one or more values generated by the instruction execution, where n and m are respective integers greater than one, each processing instruction defining one or more architectural registers to store one or more source operands.

The register circuitry 70 provides a set of physical registers, which can be allocated to architectural registers for the execution of the processing instructions. Architectural registers are defined by the processor architecture and its instruction set architecture (ISA). An instruction will define one or more architectural registers to hold source or destination (output) operands, but in actual execution these architectural registers will be implemented by respective physical registers 70. It is possible in some systems (and within the scope of the present disclosure) to provide so-called register renaming so that an architectural register can be temporarily associated with any of a set of physical registers, for example for the purposes of out-of-order execution. However, in other examples such as that to be described here, there is a one-to-one relationship between architectural and physical registers.

In performing such execution, the storage array may act as an accumulation array of the type discussed above as ZA. The processing circuitry, in response to a decoded instruction, may perform a processing operation such as a matrix processing operation using the storage array to accumulate the results of the operation. In other words, the instruction execution circuitry executes instructions decoded by the instruction decoder circuitry 50, the instruction execution circuitry being configured to execute a decoded instruction by reference to one or more source operands stored by the set of architectural registers and to hold one or more values generated by that decoded instruction. This could be an output for storage to an architectural register, or one or more values for storage to memory, or the like.

Detector circuitry 55 is provided which detects groups of instructions which comply with a conflict condition, in which a group of instructions complies with the conflict condition at least when a given storage element is written to by a maximum of one instruction of that group of instructions. The operation of the detector circuitry will be discussed in more detail below.

The result of such a detection affects the potential out of order operation of the processing circuitry. The processing circuitry 60 is capable of out of order operation but a fully comprehensive out of order capability could require a significant and potentially undesirable amount of hardware to track data dependencies at a low granularity level, and/or additional storage, for example to provide multiple versions for the same architectural register or full renaming, which could in turn provide an undesirable circuit area and power consumption increase.

Instead, in the present embodiments, the detector circuitry detects (using techniques to be described below) groups of decoded instructions amongst which out of order operation can be allowed without leading to data hazards, such that the processing circuitry then allows for out of order execution within such a group. Note that the fact that out of order execution is possible does not impose a requirement on the processing circuitry to execute the instructions in an order other than their original instruction order; just that this is possible. In contrast, out of order execution is disallowed as between such groups of instructions.

As discussed, the processing instructions may be matrix processing instructions; and the storage array may be an accumulation array comprising an n×m array of accumulation elements. In examples, the processing circuitry is configured to selectively execute: (i) processing instructions to generate some or all of an individual row or an individual column of the n×m matrix; and (ii) processing instructions to generate a matrix region (referred to below as a tile) comprising a rectangular array representing some or all of the n×m matrix.

Out of Order Operation

Out of order operation, as between a group of instructions, can be provided using a common accumulation array when there is no conflict of access to the accumulation array by instructions within the group. Here, conflicts may refer to examples such as write-after-read (WAR), read-after-write (RAW) and write-after-write (WAW) hazards. When no such conflicts are present as between a given group, the instructions can be issued in any order without leading to data hazards arising from the use of the common accumulation array.

The present examples do not use register renaming for architectural registers or for the accumulation array. However, the present examples can be applicable in the case of a common accumulation array whether or not register renaming is used for other architectural registers.

Detection by the Detector Circuitry 55

In general terms, the detector circuitry is configured to detect that a group of instructions complies with the conflict condition at least when a given storage element is accessed by a maximum of one instruction of that group of instructions. The detector circuitry is configured to associate a group identifier with each detected group of instructions, the group identifiers forming an ordered sequence indicative of an order of the detected groups with respect to the instruction order. In other words, the detector circuitry is configured to detect successive groups with respect to the instruction order.

Various examples of detections by the detector circuitry 55 will now be described. The aim is to detect potential data hazards or conflicts in respect of accesses to the storage (accumulation) array, represented schematically in FIG. 2 as a square array of 16×16 storage elements, noting that 16 is simply an example of n and m for the purposes of the present description and that other values of n and/or m can be used. While it would be possible to maintain a corresponding conflict register having 256 (16×16) elements, one for each storage element of the array 200, this could become unwieldy and excessively large in the case of very large storage arrays 200. Instead, different options will be presented here.

Decoded instructions are presented to the detector circuitry 55 in program order.

Examples of the types of hazard which the present arrangements aim to detect include write-after-read (WAR), read-after-write (RAW) and write-after-write (WAW) hazards. Multiple successive reads (with no intervening write, or so-called read-after-read (RAR) events) can be ignored in some example embodiments, for example by being treated simply as a single "read" as they do not themselves represent a potential hazard.

Figure 2:
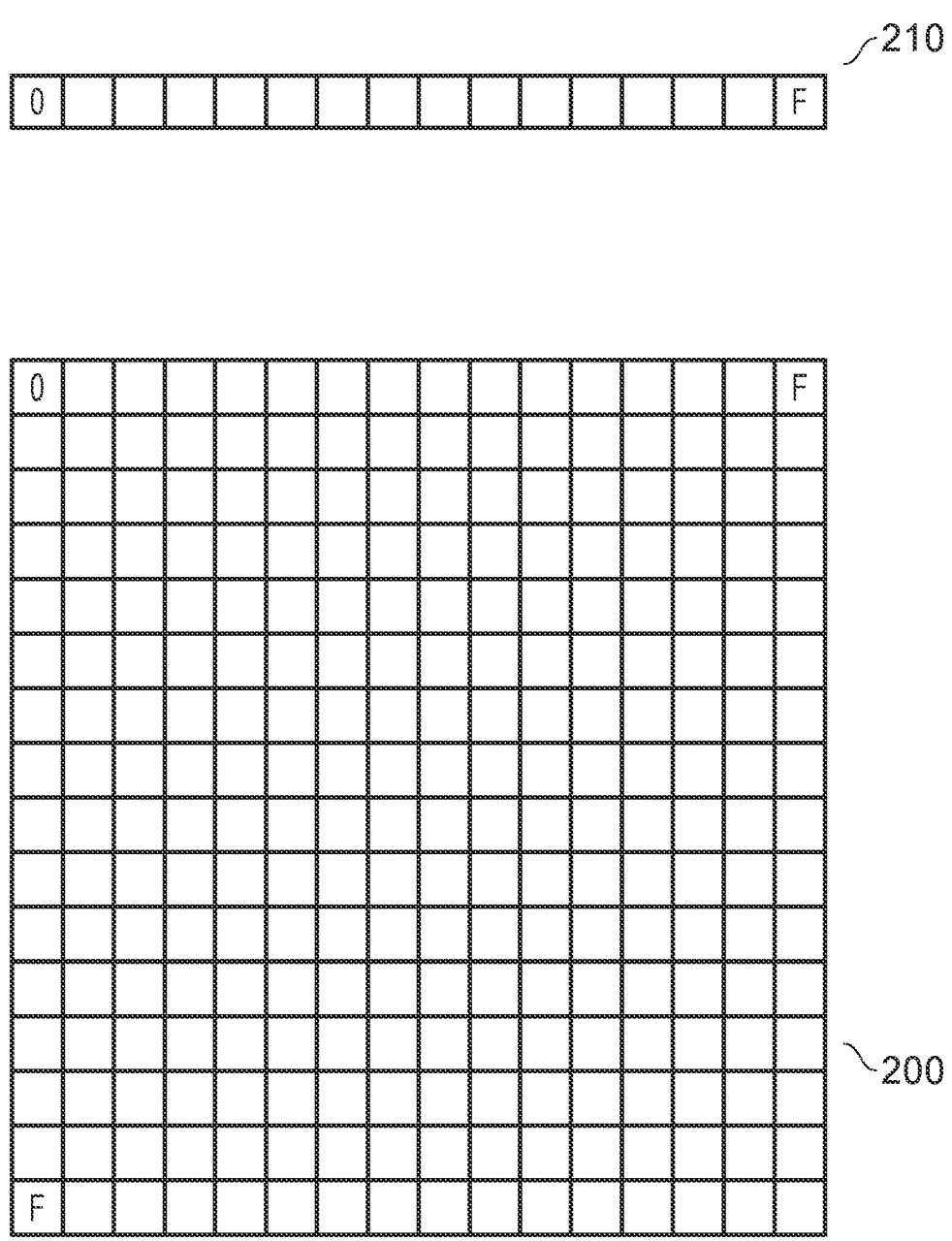
FIGS. 2 and 3 schematically illustrate example detections.

Referring to FIG. 2, a so-called "row-column vector" (RCV) 210 is illustrated. This provides one example of a technique to record data dependencies.

The RCV has one entry or element for each row or column. In the example of FIG. 2, where there are 16 rows and 16 columns, the RCV has 16 entries or elements. For clarity of FIG. 2, these are numbered from 0 to F (the hexadecimal representation of decimal 15). Similarly, the storage array rows are numbered from 0 to F and the storage array columns are numbered from 0 to F.

Amongst the decoded instructions output by the decoder circuitry 50, the detector circuitry 55 detects whether an instruction will access (for example read from or write to) a matrix row or column of the storage array 200 when executed. In any situation where the detector circuitry 55 detects that an instruction, when executed, will access any element of a given row, for example row m (where $0<=m<=F$ in the present example) then the element m is set in the RCV 210. Similarly, in any situation where the detector circuitry 55 detects that an instruction, when executed, will access any element of row p (where $0<=p<=F$) then the detector circuitry sets element p in the RCV 210.

Accordingly, while the use of the RCV 210 saves considerably in terms of conflict register storage over other possible options, it is somewhat conservative in its detection of conflicts. If a conflict does exist, it will be detected using the RCV 210, but the use of the RCV 210 may indicate conflicts where in fact no conflict is actually present. However, given that the present arrangements relates to an aim to improve performance while not increasing the risk of incorrect operation because of data hazards and the like, such a conservative approach represents a balance between the allocation of resources to the conflict detection the potential improvement of performance and the maintenance of "safe" operation.

Possible techniques to allow for RAR events (as discussed above) to be excluded or ignored may include for example:

Using plural (for example, 2) bits per entry, one indicating whether a row/column has been written and one indicating whether a row/column has been read. In this case a further read or write will be detected as a conflict; or Using a single bit for the full row or column which is set to an indicator state (for example, to a logical 1) as soon as at least one entry is written or read, in which case the system treats all elements of that row (column) as having potentially been the subject of a write or read.

In some examples, the use of the RCV 210 can be applied to all instructions which access the storage array 200.

In other examples, the detector circuitry can treat two categories of instructions differently, for example a first category of instructions producing a matrix row or column (for which conflicts are detected using the RCV 210 as described above) and a second category of instructions producing a partial or full matrix for which a so-called "tile table" may be used. This technique will now be described.

Figure 3:
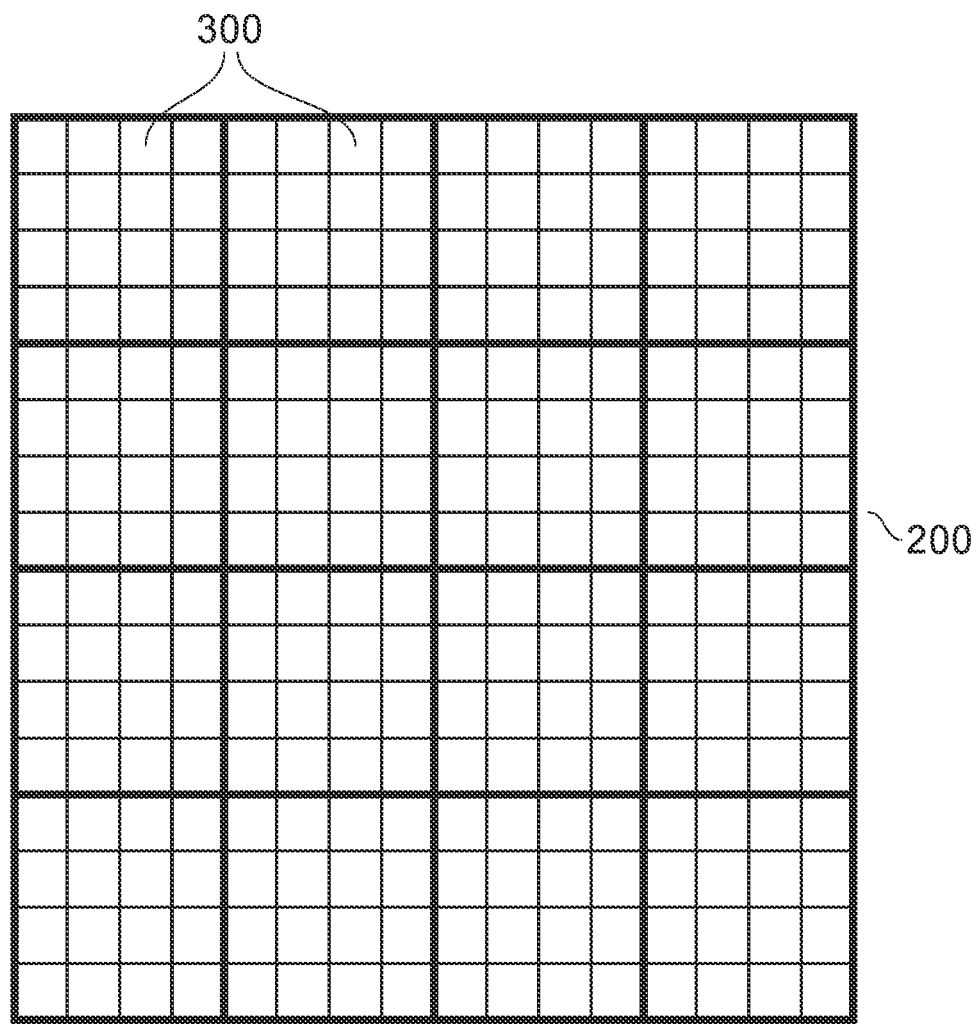

Referring to FIG. 3, an example is illustrated in which the array 200 is treated as 16 tiles 300 separated in FIG. 3 by bold schematic lines. This is purely an example and other arrangements could be used. A tile table of 16 entries (in this example) is maintained, with each entry responding to a respective tile in a predetermined order (for example, entry 0 referring to a top left tile as drawn, with a left to right raster countdown to an entry F referring to a bottom right tile as drawn). Whenever an instruction in the second category accesses one of the tiles 300, a corresponding entry or element in the tile table is set.

In any of these examples, a conflict is detected by an instruction needing to set an element in the RCV and/or an element in the tile table as the case may be, when that element is already set in respect of an instruction previously handled by the detector circuitry 55.

The detector circuitry 55 allocates a group identifier (GID) to groups of instructions for which no mutual conflict is detected using any of the techniques described above. When a conflict is first detected, the GID advances to a next GID in a predetermined order, for example a cyclic order of (for example) 16 possible GID values. In other words, the group identifiers may form a cyclic ordered sequence, in which a group identifier is made available for allocation to a next group of instructions by the detector circuitry when all instructions associated with that group identifier have been executed.

In the case of a next GID not being available (because of a backlog of GID retirements for example) the detector circuitry is configured to stall operation in response to a next group identifier not being available.

The use of the RCV provides an example of maintaining a conflict register of n elements and to activate an mth element of the conflict register in response to an instruction accessing an mth row or an mth column of the n×m array of storage elements, in which a group of instructions complies with the conflict condition at least when a given element of the conflict register is activated by a maximum of one instruction of that group of instructions.

The use of the tile table provides an example of maintaining a conflict register having elements corresponding to respective partial regions of the n×m array of storage elements and to activate an element of the conflict register in response to an instruction accessing the respective partial region of the n×m array of storage elements, in which a group of instructions complies with the conflict condition at least when a given element of the conflict register is activated by a maximum of one instruction of that group of instructions.

In terms of the detection of hazards or potential hazards when switching operation between a horizontal row, vertical column or tile of the array 200, example embodiments may operate as follows:

When a current operation concerns a vector relating to a "horizontal row" and a next instruction concerns a "vertical column" or "tile" (or other permutations or orders), some example embodiments will treat this as a potential hazard and create a new (next) GID.

However, the approach used does not have to be that strict. For example, in the case of moving from a horizontal row to a vertical column: the detection circuitry can assume that all vertical elements of the column have been accessed, but if the operation was read-only other read accesses may be permitted. A similar approach may apply to vertical-to-horizontal transitions.

Overview of GID Use

As discussed below, execution—potentially out of order—takes place within a single group having a given GID, and instructions of a next GID in the predetermined order are not issued at least until all of the instructions of the current GID have been issued for execution. In other words, for respective groups of instructions earlier and later with respect to the instruction order (that is the order of GIDs), the instruction execution circuitry is configured to defer execution of any instruction in the group of instructions later with respect to the instruction order at least until all instructions in the group of instructions earlier with respect to the instruction order have been issued for execution.

In other words, this arrangement allows for a limited level of out of order execution within groups of instructions where the detector circuitry 55 has detected that a data hazard or access conflict to the accumulation array does not exist. As noted above, this detection may be conservative such that the grouping of instructions is more cautious than is absolutely necessary, but the detection techniques described above provide for a safe detection and the avoidance of data hazards.

By restricting out of order execution in this manner, the need for multiple instances of physical registers to allow for renaming of architectural registers, and in particular to allow for the renaming of the accumulation array is avoided or at least alleviated.

An issue policy may define that at the issue stage, instructions belonging to a group having the oldest non-issued GID are issued first. They can be issued out of order with respect to one another. Only when all of these instructions have been issued, instructions belonging to the next oldest GID are now allowed to be issued-once again, potentially in an out of order manner with respect to one another.

A GID count table may be used to keep count of the number of instructions which have been assigned a specific GID. This table is updated when an instruction is being assigned it's GID. If no hazard or conflict is detected by the RCV or tile table (as appropriate) the GID is unchanged but the instruction count is incremented. If, however, a hazard or conflict is detected, the GID is incremented as well as the instruction count for the new GID.

At issue, the table is read starting from the oldest GID whose count is not null or zero. Instruction count for this GID is decreased every time an instruction having the matching GID is issued. When the count reaches 0, the issue GID is incremented (that is to say, moved to the next GID value in the predetermined order).

Pipelined Operation Example

Figure 4:
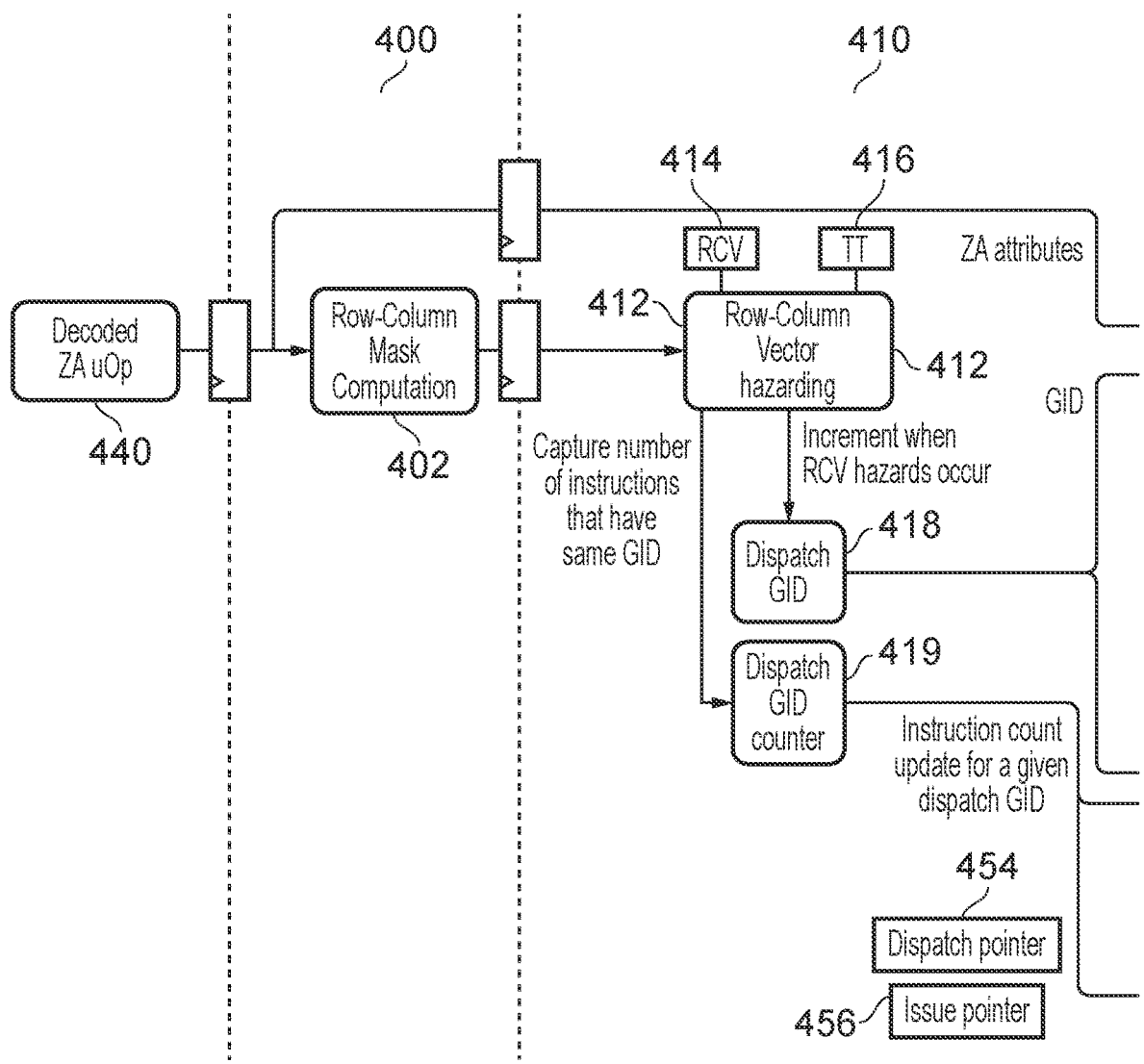
FIG. 4 schematically illustrates a pipelined operation.
Figure 4:
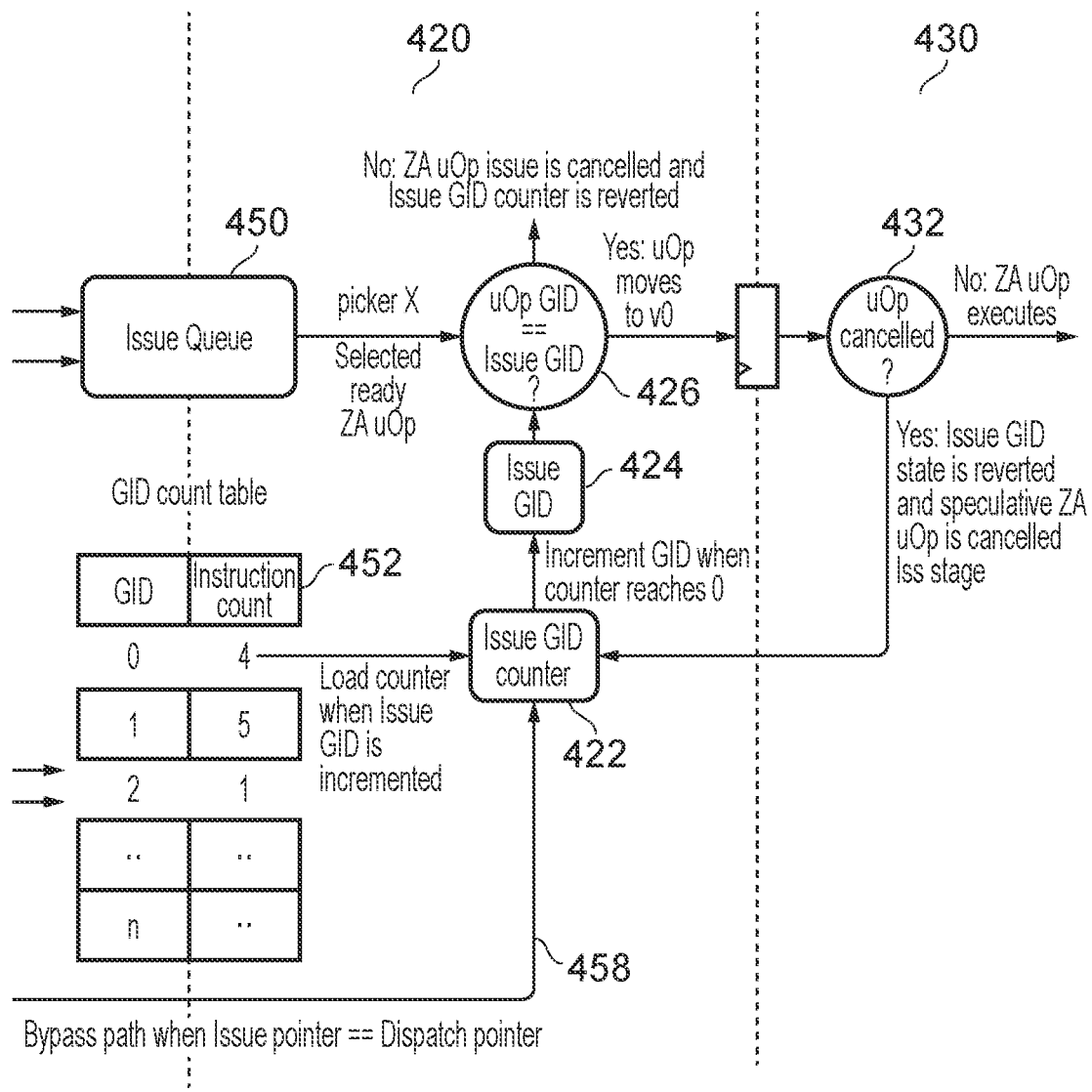

FIG. 4 represents a schematic illustration of pipelined operation using the above techniques. Various successive pipeline stages 400, 410, 420, 430 are illustrated in connection with a decoded instruction 440 referred to in FIG. 4 as a "ZA µOp" or in other words an accumulation array micro operation.

In general terms, instruction issue circuitry (450—described below) is configured to selectively issue a given instruction directly to the instruction execution circuitry when the given instruction is in a group of instructions currently being executed by the instruction execution circuitry. The instruction issue circuitry is configured to maintain an issue queue of instructions awaiting issue and to associate a respective group identifier with each instruction in the issue queue.

At a stage 400, the detector circuitry 55 generates (for internal use by the detector circuitry 55) a row-column mask using row-column mask computation circuitry 402. This represents an indication of which rows and columns are going to be accessed by the current ZA µOp when executed.

At a stage 410, the detector circuitry 55 uses hazard detection circuitry 412 to detect potential conflicts or hazards for the current ZA µOp using one or both of a register 414 storing the RCV and a register 416 storing the tile table (TT). The circuitry 412 accesses a dispatch GID register 418 and a dispatch GID counter 419. The dispatch GID register 418 stores a GID being allocated the current ZA µOp. The dispatch GID counter 419 stores a count of instructions associated with each dispatch GID.

The ZA µOp is routed to an issue queue 450 along with its associated GID from the dispatch GID register 418.

The issue queue 450 maintains the GID count table 452 mentioned above which is updated by the dispatch GID counter 419. It is also updated for a given GID when an instruction having that GID is issued for execution.

At a stage 420 an issue GID counter 422 is loaded with an instruction count corresponding to a new GID when the issue GID 424 (that is, the GID of instructions being issued from the issue queue 450) is incremented. An instruction picker operation 426 compares the GID associated with a ZA μOp awaiting issue with the issue GID and if they are the same, the ZA μOp awaiting issue can be issued for execution.

A dispatch pointer 454 and an issue pointer 456 can be maintained. A bypass path 458 can be provided to bypass the GID count table and selectively provide instructions directly to the instruction execution circuitry when the given instruction is in a group of instructions currently being executed by the instruction execution circuitry, or in other words when the issue GID counter 422 when the issue pointer is the same as the dispatch pointer. In other words, the issue pointer is the oldest GID present in the issue queues, while the dispatch pointer is the most recent GID reaching the issue queues. When the issue pointer and the dispatch pointer are pointing to the same value, instructions that are entering issue queue are part of the current GID and so do not have an issue constraint. In example arrangements the issue GID counter 422 is basically a copy of GID count table entry for the current Issue GID 424 being considered for issue. If the dispatch GID 418 and issue GID 424 are equal (meaning the dispatch pointer 454 and issue pointer 456 are equal) then we directly need to write to the issue GID counter 422 to ensure that it is up-to-date (and save some power by not writing to the GID count table 422).

Handling Cancelled Instructions

A schematic stage 430 refers to the situation where execution of a ZA μOp is cancelled for whatever reason. In at least some situations where this might happen, this could result in the ZA μOp being re-presented for issue and execution, which could in principle lead to it being executed out of order with other instructions from a subsequent GID with which it potentially has a data hazard or conflict.

One option to deal with this is to prevent the issue of any instructions from a next GID until completion of all of the instructions from a current GID. However, this could lead to potential stalling or delaying of execution.

Instead, in the present examples, when a detection 432 is made of a ZA μOp being cancelled, the instruction execution circuitry is configured, in response to cancellation of an instruction in a given instruction group, to cancel any already-issued instructions in an instruction group later with respect to the instruction order (or the predetermined order of GIDs) than the given instruction group.

Method Example

Figure 5:
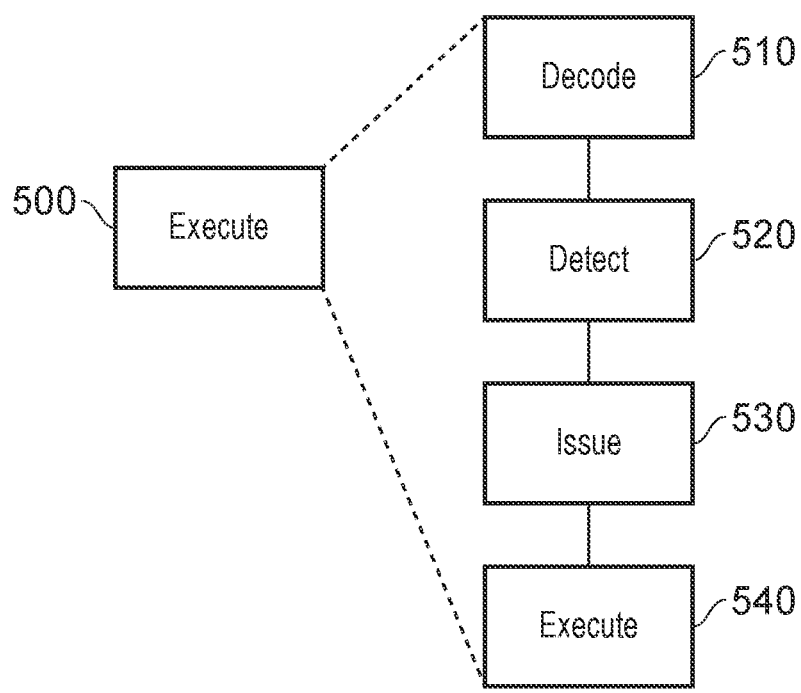
FIG. 5 is a schematic flowchart illustrating a method.

FIG. 5 is a schematic flowchart illustrating a data processing method comprising: executing (at a step 500) processing instructions having an instruction order to generate one or more rows and/or one or more columns of an n×m matrix using a storage array having an n×m array of storage elements to hold one or more values generated by the instruction execution, where n and m are respective integers greater than one, each processing instruction defining one or more architectural registers to store one or more source operands, the executing step comprising: decoding (at a step 510) processing instructions; detecting (at a step 520) groups of instructions which comply with a conflict condition, in which a group of instructions complies with the conflict condition at least when a given storage element is written to by a maximum of one instruction of that group of instructions; issuing (at a step 530) decoded instructions for execution; and executing (at a step 540) decoded instructions by reference to one or more source operands stored by the set of architectural registers and holding, using the storage array, one or more values generated by the decoded instructions, comprising selectively providing out of order execution of a group of processing instructions detected by the detector circuitry to comply with the conflict condition.

Virtual Machine Example

Figure 6:
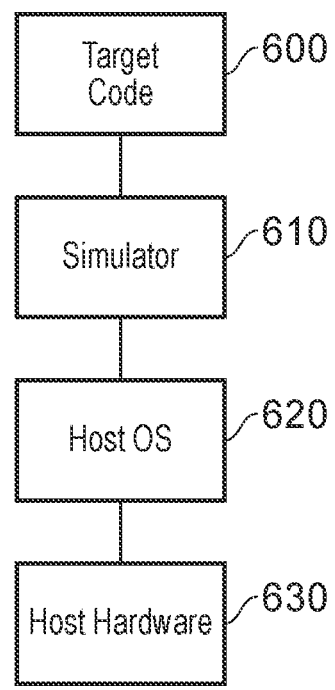
FIG. 6 schematically illustrates a simulator implementation.

FIG. 6 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 630, optionally running a host operating system 620, supporting the simulator program 610. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 630), some simulated embodiments may make use of the host hardware, where suitable.

The simulator program 610 may be stored on a computer-readable storage medium (which may be a non-transitory medium), and provides a program interface (instruction execution environment) to the target code 600 (which may include applications, operating systems and a hypervisor) which is the same as the interface of the hardware architecture being modelled by the simulator program 610. Thus, the program instructions of the target code 600, including the functionality described above, may be executed from within the instruction execution environment using the simulator program 610, so that a host computer 630 which does not actually have the hardware features of the apparatus discussed above can emulate these features.

Accordingly, such example arrangements provide an example of a virtual machine comprising a data processor to execute a computer program comprising machine readable instructions, in which execution of the computer program causes the data processor to operate as a data processing apparatus comprising: processing circuitry to execute processing instructions having an instruction order to generate one or more rows and/or one or more columns of an n×m matrix using a storage array having an n×m array of storage elements to hold one or more values generated by the instruction execution, where n and m are respective integers greater than one, each processing instruction defining one or more architectural registers to store one or more source operands, the processing circuitry comprising: a set of physical registers; instruction decoder circuitry to decode processing instructions; detector circuitry to detect groups of instructions which comply with a conflict condition, in which a group of instructions complies with the conflict condition at least when a given storage element is written to by a maximum of one instruction of that group of instructions; instruction issue circuitry to issue decoded instructions for execution; and instruction execution circuitry to execute instructions decoded by the instruction decoder circuitry, the instruction execution circuitry being configured to execute a decoded instruction by reference to one or more source operands stored by the set of architectural registers and to hold one or more values generated by that decoded instruction, the instruction execution circuitry comprising: the storage array; and out of order circuitry to selectively provide out of order execution of a group of processing instructions detected by the detector circuitry to comply with the conflict condition.

General Matters

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

What is claimed is:

1. A data processing apparatus comprising:
processing circuitry configured to execute processing instructions having an instruction order to generate one or more rows and/or one or more columns of an n×m matrix using a storage array having an n×m array of storage elements to hold one or more values generated by the instruction execution, where n and m are respective integers greater than one, each processing instruction defining one or more architectural registers to store one or more source operands, the processing circuitry comprising:
a set of physical registers;
instruction decoder circuitry configured to decode processing instructions;
detector circuitry configured to detect a groups of instructions having a maximum of one instruction of that group of instructions that writes to a given storage element;
instruction issue circuitry configured to issue decoded instructions for execution; and
instruction execution circuitry configured to execute instructions decoded by the instruction decoder circuitry, the instruction execution circuitry being configured to execute a decoded instruction by reference to one or more source operands stored by the set of architectural registers and to hold one or more values generated by that decoded instruction, the instruction execution circuitry comprising:
the storage array; and
out of order circuitry configured to selectively provide out of order execution of the group of processing instructions detected by the detector circuitry.

2. The apparatus of claim 1, in which the processing circuitry is configured to selectively execute:
(i) processing instructions to generate some or all of an individual row or an individual column of the n×m matrix; and
(ii) processing instructions to generate a matrix region comprising a rectangular array representing some or all of the n×m matrix.

3. The apparatus of claim 1, in which the detector circuitry is configured to detect successive groups with respect to the instruction order.

4. The apparatus of claim 3, in which the detector circuitry is configured to associate a group identifier with each detected group of instructions, the group identifiers forming an ordered sequence indicative of an order of the detected groups with respect to the instruction order.

5. The apparatus of claim 4, in which the group identifiers form a cyclic ordered sequence, in which a group identifier is made available for allocation to a next group of instructions by the detector circuitry when all instructions associated with that group identifier have been executed.

6. The apparatus of claim 5, in which the detector circuitry is configured to stall operation in response to a next group identifier not being available.

7. The apparatus of claim 4, in which the instruction issue circuitry is configured to maintain an issue queue of instructions awaiting issue and to associate a respective group identifier with each instruction in the issue queue.

8. The apparatus of claim 7, in which the instruction issue circuitry is configured to selectively issue a given instruction directly to the instruction execution circuitry when the given instruction is in a group of instructions currently being executed by the instruction execution circuitry.

9. The apparatus of claim 3, in which, for respective groups of instructions earlier and later with respect to the instruction order, the instruction execution circuitry is configured to defer execution of any instruction in the group of instructions later with respect to the instruction order at least until all instructions in the group of instructions earlier with respect to the instruction order have been issued for execution.

10. The apparatus of claim 9, in which the instruction execution circuitry is configured, in response to cancellation of an instruction in a given instruction group, to cancel any already-issued instructions in an instruction group later with respect to the instruction order than the given instruction group.

11. The apparatus of claim 1, in which the detector circuitry is configured to detect that a group of instructions complies with the conflict condition at least when a given storage element is accessed by a maximum of one instruction of that group of instructions.

12. The apparatus of claim 1, in which the detector circuitry is configured to maintain a conflict register of n elements and to activate an mth element of the conflict register in response to an instruction accessing an mth row or an mth column of the n×m array of storage elements.

13. The apparatus of claim 1, in which the detector circuitry is configured to maintain a conflict register having elements corresponding to respective partial regions of the n×m array of storage elements and to activate an element of the conflict register in response to an instruction accessing the respective partial region of the n×m array of storage elements, in which a group of instructions complies with the conflict condition at least when a given element of the conflict register is activated by a maximum of one instruction of that group of instructions.

14. The apparatus of claim 1, in which:
the processing instructions are matrix processing instructions; and
the storage array is an accumulation array comprising an n×m array of accumulation elements.

15. A data processing method comprising:
executing processing instructions having an instruction order to generate one or more rows and/or one or more columns of an n×m matrix using a storage array having an n×m array of storage elements to hold one or more values generated by the instruction execution, where n and m are respective integers greater than one, each processing instruction defining one or more architectural registers to store one or more source operands, the executing step comprising:
decoding processing instructions;
detecting a groups of instructions having a maximum of one instruction of that group of instructions that writes to a given storage element;
issuing decoded instructions for execution; and
executing decoded instructions by reference to one or more source operands stored by the set of architectural registers and holding, using the storage array, one or more values generated by the decoded instructions, comprising selectively providing out of order execution of a group of processing instructions detected by the detector circuitry.

16. A virtual machine comprising a data processor to execute a computer program comprising machine readable instructions, in which execution of the computer program causes the data processor to operate as a data processing apparatus comprising:
processing circuitry configured to execute processing instructions having an instruction order to generate one or more rows and/or one or more columns of an n×m matrix using a storage array having an n×m array of storage elements to hold one or more values generated by the instruction execution, where n and m are respective integers greater than one, each processing instruction defining one or more architectural registers to store one or more source operands, the processing circuitry comprising:
a set of physical registers;
instruction decoder circuitry configured to decode processing instructions;
detector circuitry configured to detect a groups of instructions having a maximum of one instruction of that group of instructions that writes to a given storage element;
instruction issue circuitry configured to issue decoded instructions for execution; and
instruction execution circuitry configured to execute instructions decoded by the instruction decoder circuitry, the instruction execution circuitry being configured to execute a decoded instruction by reference to one or more source operands stored by the set of architectural registers and to hold one or more values generated by that decoded instruction, the instruction execution circuitry comprising:
the storage array; and
out of order circuitry configured to selectively provide out of order execution of a group of processing instructions detected by the detector circuitry.

* * * * *